(12) United States Patent
Huang et al.

(10) Patent No.: US 11,435,215 B2
(45) Date of Patent: Sep. 6, 2022

(54) ELECTRIC POT AND LIQUID LEVEL DETERMINING METHOD WHICH CAN DETERMINE LIQUID LEVEL AND SOLID HEIGHT BY LIGHT WITH DIFFERENT WAVE LENGTHS

(71) Applicant: PixArt Imaging Inc., Hsin-Chu (TW)

(72) Inventors: Sen-Huang Huang, Hsin-Chu (TW); Yi-Hsien Ko, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 440 days.

(21) Appl. No.: 16/684,529

(22) Filed: Nov. 14, 2019

(65) Prior Publication Data
US 2021/0148748 A1 May 20, 2021

(51) Int. Cl.
*G01F 23/292* (2006.01)
*G06T 7/521* (2017.01)

(52) U.S. Cl.
CPC ............ *G01F 23/292* (2013.01); *G06T 7/521* (2017.01); *G06T 2207/10028* (2013.01); *G06T 2207/10048* (2013.01); *G06T 2207/10152* (2013.01)

(58) Field of Classification Search
CPC ... G01F 23/292; G01F 23/2928; G06T 7/521; G06T 2207/10028; A47J 27/00; A47J 36/00; A47J 36/32
See application file for complete search history.

(56) References Cited

U.S. PATENT DOCUMENTS

| | | | | |
|---|---|---|---|---|
| 6,098,029 | A * | 8/2000 | Takagi | G01F 23/292 702/55 |
| 6,782,122 | B1 * | 8/2004 | Kline | G01F 23/292 382/142 |
| 7,383,152 | B1 * | 6/2008 | Moore | F42B 33/0285 702/159 |
| 10,527,480 | B2 * | 1/2020 | Cipullo | G01B 11/0608 |
| 2005/0178197 | A1 * | 8/2005 | Ramus | G01F 23/242 73/290 V |
| 2010/0101317 | A1 * | 4/2010 | Ashrafzadeh | G01F 23/26 702/188 |
| 2012/0127290 | A1 * | 5/2012 | Tojo | G01N 21/41 348/61 |
| 2015/0116460 | A1 * | 4/2015 | Jouet | G06T 15/50 348/46 |
| 2015/0160252 | A1 | 6/2015 | Murakami | |

FOREIGN PATENT DOCUMENTS

| | | | | |
|---|---|---|---|---|
| CN | 107361625 | A * | 11/2017 | ............ A47J 27/002 |
| CN | 107361625 | A | 11/2017 | |
| CN | 107374313 | A | 11/2017 | |
| CN | 110057425 | A | 7/2019 | |

\* cited by examiner

Primary Examiner — Jayanti K Patel
Assistant Examiner — Christopher Kingsbury Glover
(74) Attorney, Agent, or Firm — Winston Hsu

(57) ABSTRACT

The present invention provides an electric pot comprising a first light source, a second light source, an image sensor and a processor. The first light source and the second light source respectively generates first light having a first wavelength and second light having a second wavelength. The first light generates a first light pattern on the surface of liquid, and the second light generates a second light pattern on the surface of solid in the liquid. The processor determines a liquid level of the liquid based on the first light pattern and determines a solid height of the solid based on the second light pattern.

15 Claims, 9 Drawing Sheets

ELECTRIC POT AND LIQUID LEVEL DETERMINING METHOD WHICH CAN DETERMINE LIQUID LEVEL AND SOLID HEIGHT BY LIGHT WITH DIFFERENT WAVE LENGTHS

BACKGROUND OF THE INVENTION

1. Field of the Invention

The present invention relates to an electric pot and a liquid level determining method, and particularly relates to an electric pot and a liquid level determining method which can calculate a liquid level of the liquid in the electric pot by an optical manner.

2. Description of the Prior Art

An electric pot can be applied to boil water or to cook food via steam or poaching. However, a conventional electric pot always has no function of calculating a liquid level of the liquid therein, thus a user must open a cover of the electric pot to carefully check the liquid level.

SUMMARY OF THE INVENTION

Therefore, one objective of the present invention is to provide an electronic pot which can determine a liquid level of liquid therein.

Another objective of the present invention is to provide a liquid level determining method applied to an electric pot, which can determine a liquid level of liquid therein.

One embodiment of the present invention discloses an electric pot, which comprises: at least one light source, configured to emit light to liquid in the electric pot, wherein the light forms a first light pattern on a surface of the liquid; an image sensor, configured to detect the first light pattern; and a processor, configured to determine a liquid level of the liquid based on the first light pattern. Further, the processor can determine a solid height of the solid in the liquid based on a second light pattern.

Another embodiment of the present invention discloses A liquid level determining method applied to an electric pot, comprising: (a) applying at least one light source to emit light to liquid in the electric pot to generate a first light pattern on a surface of the liquid; (b) determining a liquid level of the liquid based on the first light pattern. The method can further determine a solid height of the solid in the liquid based on a second light pattern.

In view of above-mentioned embodiments, the liquid level or the solid height can be calculated in an optical manner, thus the user may feel more convenience while using the electric pot.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in followings descriptions to explain the concept of the present invention. Please note, the terms "first", "second", "third" . . . in following descriptions are only used to define different steps or components, but do not mean to limit the sequence thereof.

In following embodiments, an electric pot provided by the present invention comprises at least one light source (e.g. LED or laser diode), an image sensor (e.g. CMOS image sensor or CCD image sensor) and a processor (e.g. DSP or MCU). The light source emits light to liquid in the electric pot, and the light forms a first light pattern on a surface of the liquid. The image sensor is configured to detect the first light pattern, that is, the image sensor is configured to capture an image comprising the first light pattern. The processor is configured to determine a liquid level of the liquid based on the first light pattern. The light source(s) and the image sensor can have different arrangements. Also, the light source(s) can be various kinds of light sources, thus the first light pattern can be various kinds of light patterns corresponding to the light source. Details of these embodiments are depicted in following descriptions.

Figure 1:
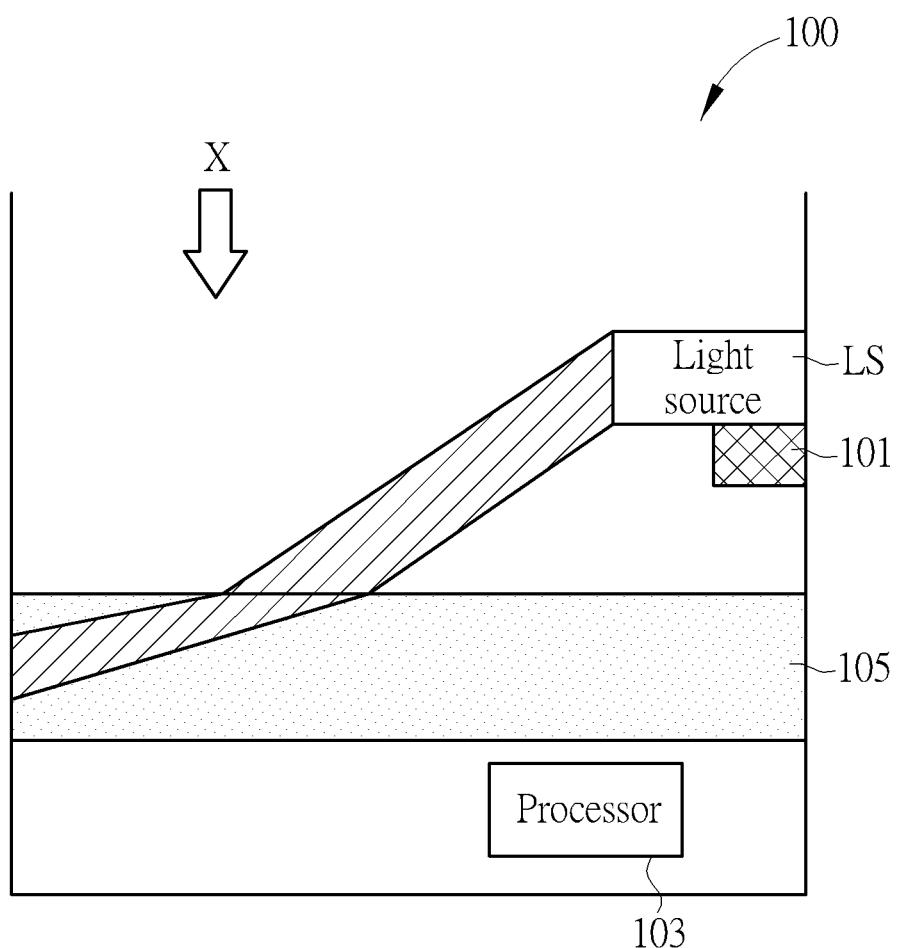
FIG. 1 is a schematic diagram illustrating an electric pot according to one embodiment of the present invention.
Figure 2A:
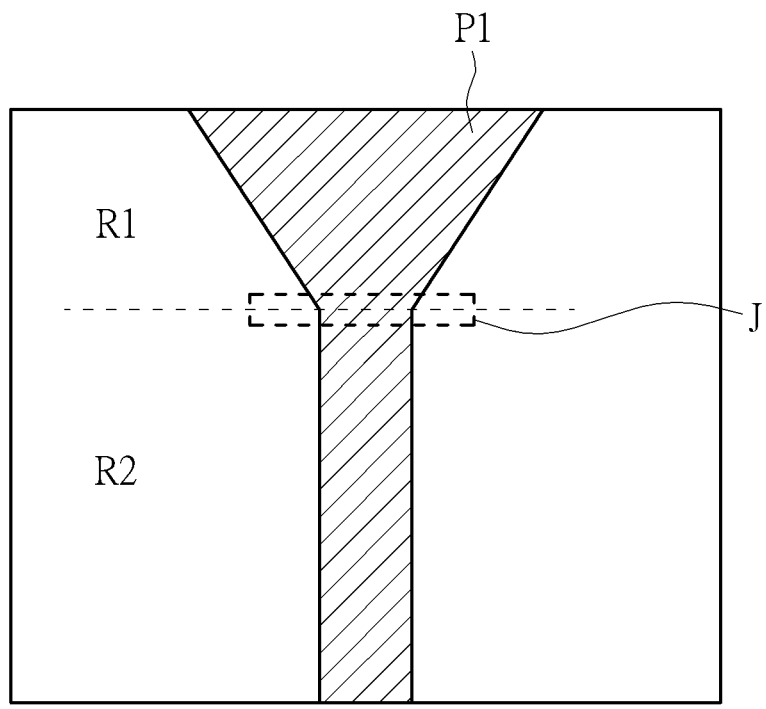
FIG. 2A and FIG. 2B are schematic diagrams illustrating examples for images captured by the image sensor in FIG. 1.
Figure 2B:
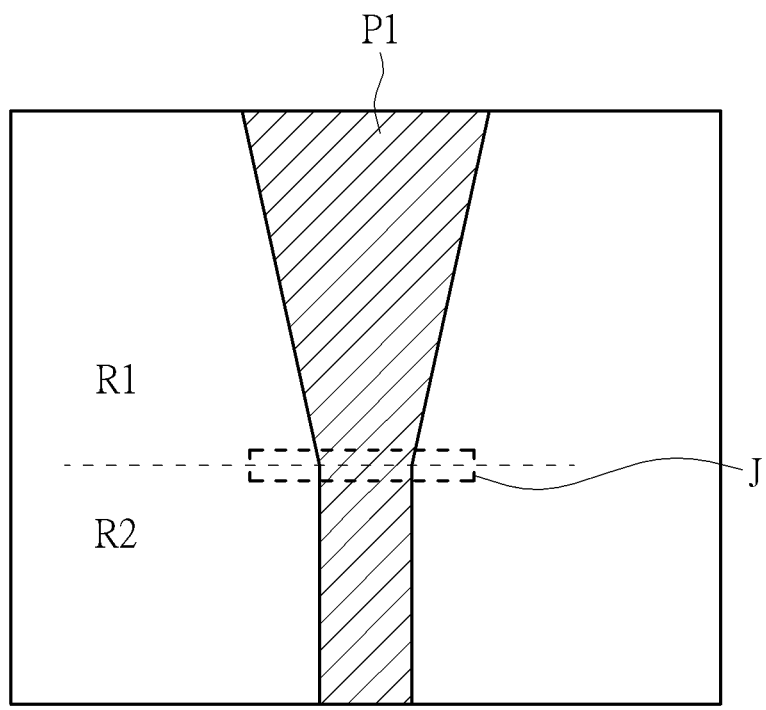

FIG. 1 is a schematic diagram illustrating an electric pot according to one embodiment of the present invention. Also, FIG. 2A and FIG. 2B are schematic diagrams illustrating examples for images captured by the image sensor in FIG. 1. Please refer to FIG. 1, FIG. 2A and FIG. 2B to understand the embodiment in FIG. 1 for more clarity. In the embodiment of FIG. 1, the light source LS and the image sensor 101 are at the same region of the electric pot 100. The region can mean, for example, a specific range of angles of the electric pot 100 if the electric pot 100 is circular or oval. Also, the region can mean "side" if the electric pot 100 is a square, rectangular or triangular. However, the light source LS and the image sensor 101 can be provided at different regions of the electric pot 100. Further, the light source LS is a line light source in the embodiment of FIG. 1. Therefore, the first light pattern P1 in FIG. 2A and FIG. 2B has a first region R1 and a second region R2. The shapes of the first region R1 and a second region R2 vary due to refraction of the liquid 105, and the variation rate of the first region R1 is larger than a variation rate of the second region R2.

FIG. 2A and FIG. 2B respectively show the first light pattern P1 corresponding to different liquid levels viewed in the direction X of FIG. 1. As illustrated in FIG. 2A, the first region R1 has a gradually decreasing width and the second region R2 has a substantially constant width. Or, the first region R1 has a greatly and gradually decreasing width and the second region R2 has a slightly and gradually decreasing width. A location of the junction J of the first region R1 and the second region R2, and shapes or sizes of the first region R1, the second region R2 may vary corresponding to different liquid levels. Therefore, the processor 103 can determine the liquid level of the liquid 105 according to a location of the junction J, or according to a shape or size of the first region R1, or according to a shape or size of the second region R2. In the examples of FIG. 2A and FIG. 2B, the liquid level in the FIG. 2A is higher than the liquid level in the FIG. 2B. Therefore, the junction J is closer to the image sensor 101 in FIG. 2B. Further, the first region R1 has a larger area and a larger width in FIG. 2B. Besides, the second region R2 has a smaller area and a shorter length in FIG. 2B.

In one embodiment, the electric pot 100 comprises a storage device (e.g. memory) provided therein, which records the relations between the liquid level and at least one of the location of the junction J, the shape/size of the first region R1, the shape/size of the second region R2. Accordingly, after the image sensor 101 captures the image of the first light pattern P1, the processor 103 can determine the location of the junction J, the shape or size of the first region R1, the shape or size of the second region R2, and then determine the liquid level based on these features.

However, the liquid level is not limited to be calculated by above-mentioned method. For example, the storage device can record the relations between the liquid level and the location of the junction J, the shape or size of the first region R1, the shape or size of the second region R2 for only some liquid levels. In such case, the processor 103 can calculate a liquid level difference between the current liquid level and the recorded liquid level according to the shift of the junction J, or the shape or size variation of the first region R1, or the shape or size of the second region R2. By this way, the current liquid level can also be determined. Such method can also be applied to any following embodiment.

Figure 3:
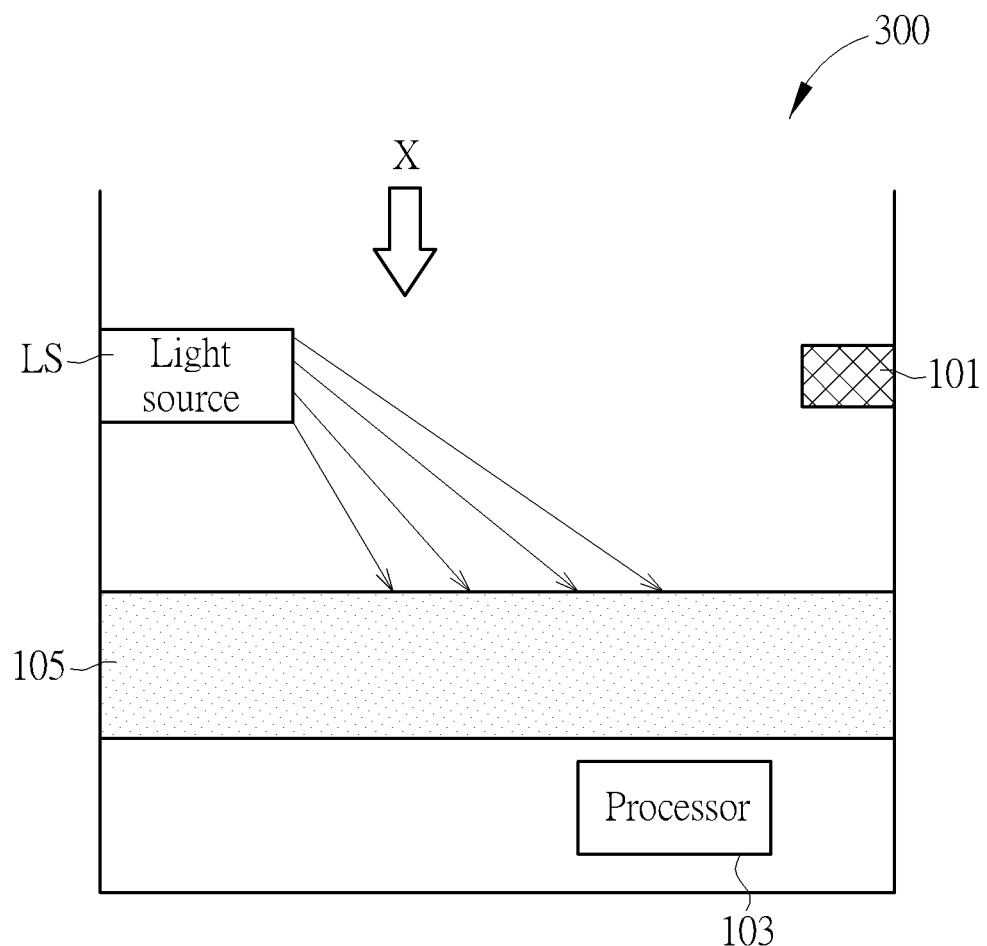
FIG. 3 is a schematic diagram illustrating an electric pot according to another embodiment of the present invention.
Figure 4A:
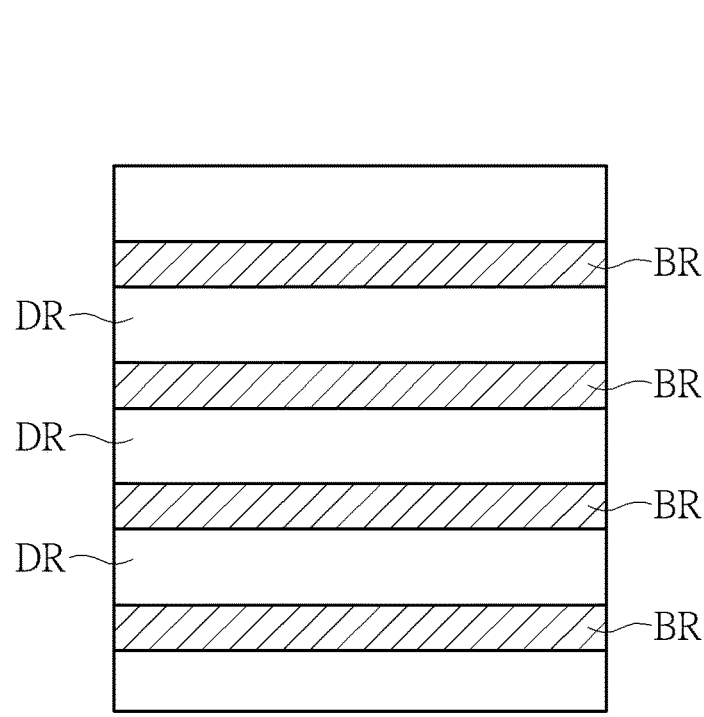
FIG. 4A and FIG. 4B are schematic diagrams illustrating examples for images captured by the image sensor in FIG. 3.
Figure 4B:
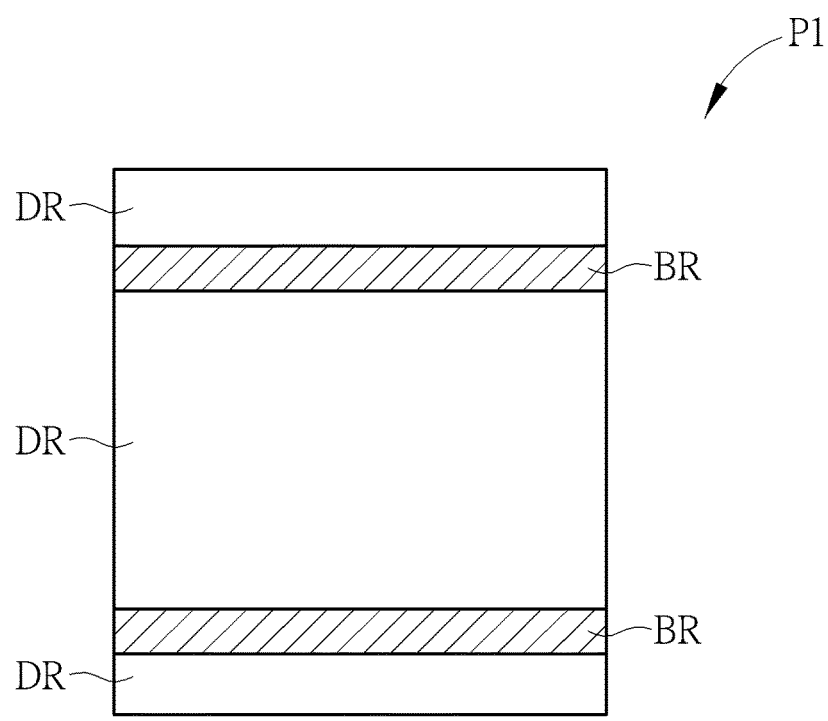

The light source LS in the electric pot can be replaced with other kinds of light source. FIG. 3 is a schematic diagram illustrating an electric pot according to another embodiment of the present invention. FIG. 4A and FIG. 4B are schematic diagrams illustrating examples for images captured by the image sensor in FIG. 3. Please refer to FIG. 3, FIG. 4A and FIG. 4B to understand the embodiment in FIG. 3 for more clarity. In the embodiment of FIG. 3, the light source LS is provided at a first region of the electric pot, and the image sensor 101 is provided a second region opposite to the first region. In other words, the light source LS and the image sensor 101 are provided at different regions of the electric pot 300. However, the light source LS and the image sensor 101 can be provided at the same region of the electric pot 300. Also, the light source LS is a structured light source. In other words, the electric pot 300 comprises a plurality light sources which are line light sources. In such case, the corresponding first light pattern has a plurality of bright regions and dark regions, and the processor 103 determines the liquid level according to a density of the bright regions.

FIG. 4A and FIG. 4B respectively show the first light pattern corresponding to different liquid levels viewed in the direction X of FIG. 3. AS illustrated in FIG. 4A and FIG. 4B, the first light pattern P1 comprises a plurality of bright regions BR and a plurality of dark regions DR, which are alternatively arranged. In FIG. 4A, the liquid level is higher, and the density of the bright regions BR is larger, which means the distance between two bright regions BR is smaller. On the opposite, in FIG. 4B, the liquid level is lower, and the density of the bright regions BR is smaller, which means the distance between two bright regions BR is larger. Therefore, the processor 103 can determine the liquid level of the liquid 105 according to the density of the bright regions BR.

In one embodiment, the electric pot 300 comprises a storage device provided therein, which records the relations between the liquid level and the densities of the bright regions BR. Accordingly, after the image sensor 101 captures the image of the first light pattern P1, the processor 103 can determine the densities of the bright regions BR and then determines the liquid level based on the densities.

Figure 5:
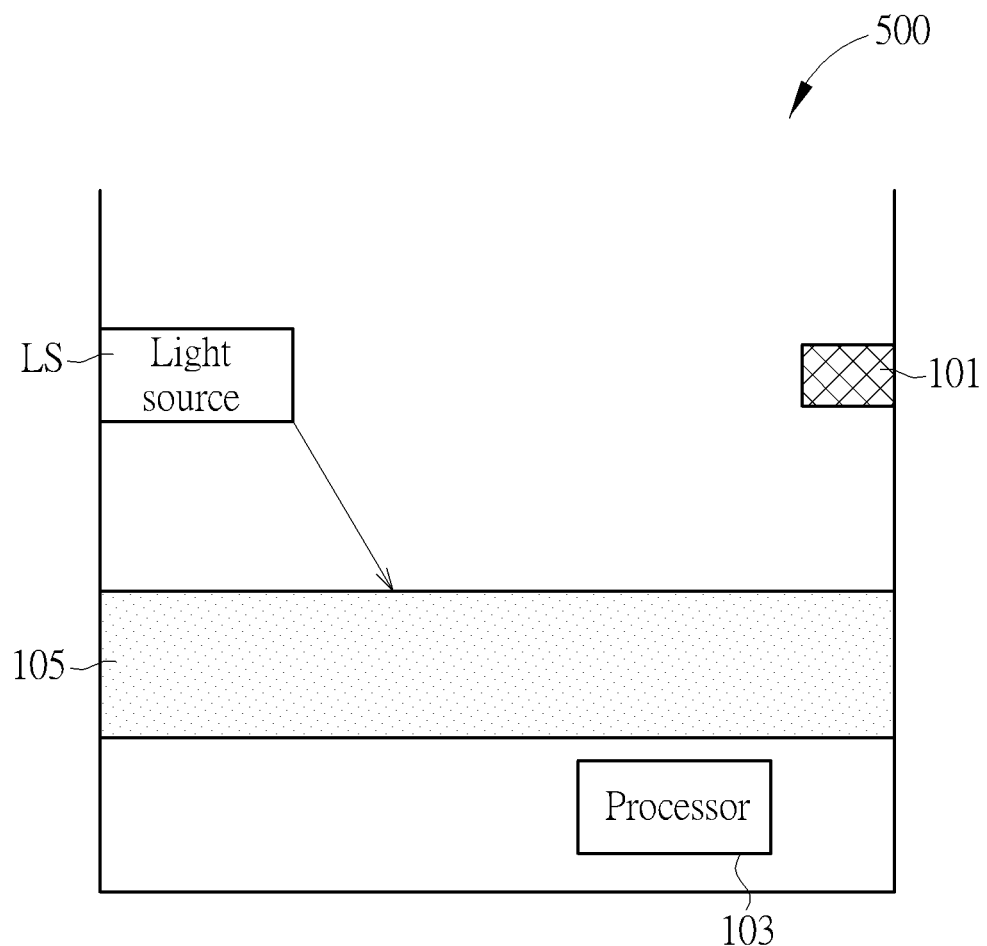
FIG. 5 is a schematic diagram illustrating an electric pot according to still another embodiment of the present invention.

FIG. 5 is a schematic diagram illustrating an electric pot according to still another embodiment of the present invention. In the embodiment of FIG. 5, the light source LS is a point light source, thus the first light pattern has a light spot. The light source LS and the image sensor 101 are provided at different regions of the electric pot 500 in the embodiment of FIG. 5. However, the light source LS and the image sensor 101 can be provided at the same region of the electric pot 500. Also, the processor 103 determines the liquid level according to the location of the light spot.

In one embodiment, the electric pot 500 comprises a storage device provided therein, which records the relations between the liquid level and the locations or sizes of the light spot. Accordingly, after the image sensor 101 captures the image of the first light pattern, the processor 103 can determine the location and then determines the liquid level based on the location.

In one embodiment, the electric pot can comprise a plurality of light sources which are point light sources. In such case, the processor 103 can determine the liquid level according to the locations of a plurality of light spots rather than the location of a single light spot. Further, the processor 103 can determine the liquid level according to the distances between light spots. Such case will be described in FIG. 6, FIG. 7A and FIG. 7B.

Figure 6:
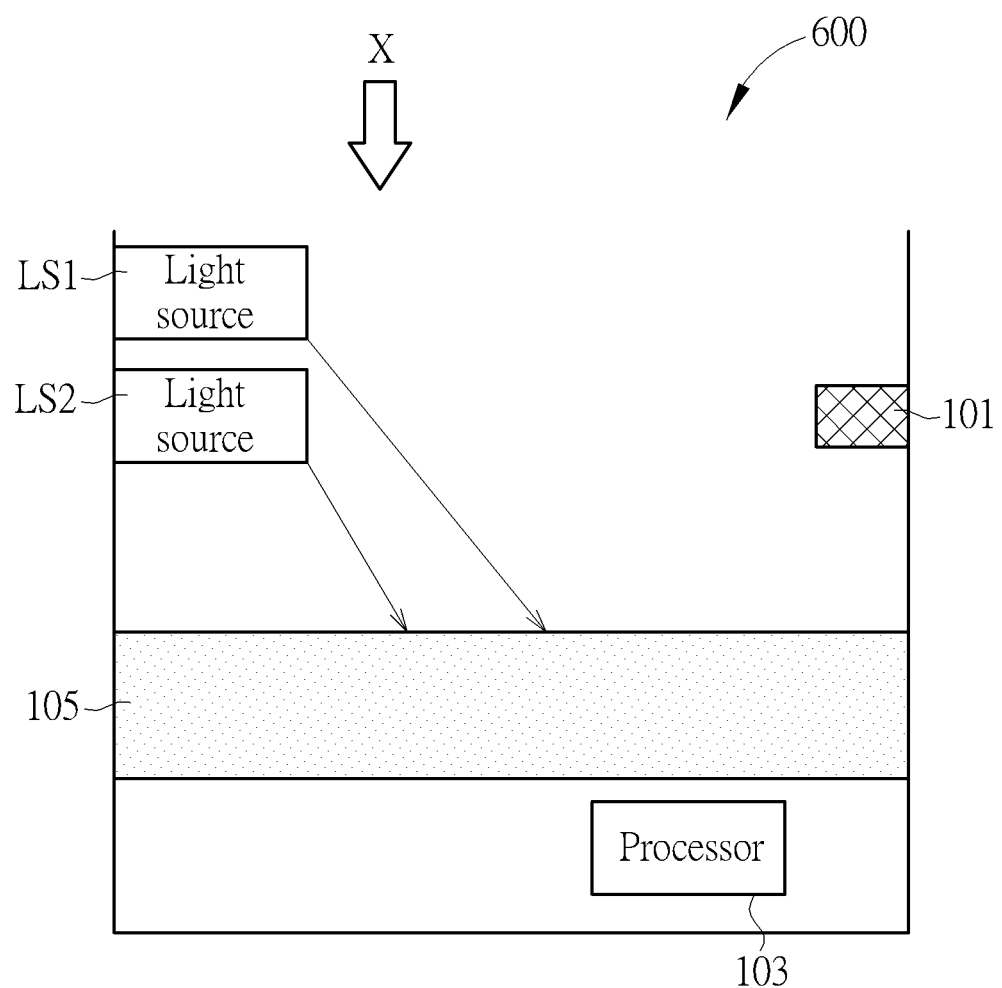
FIG. 6 is a schematic diagram illustrating an electric pot according to still another embodiment of the present invention.
Figure 7A:
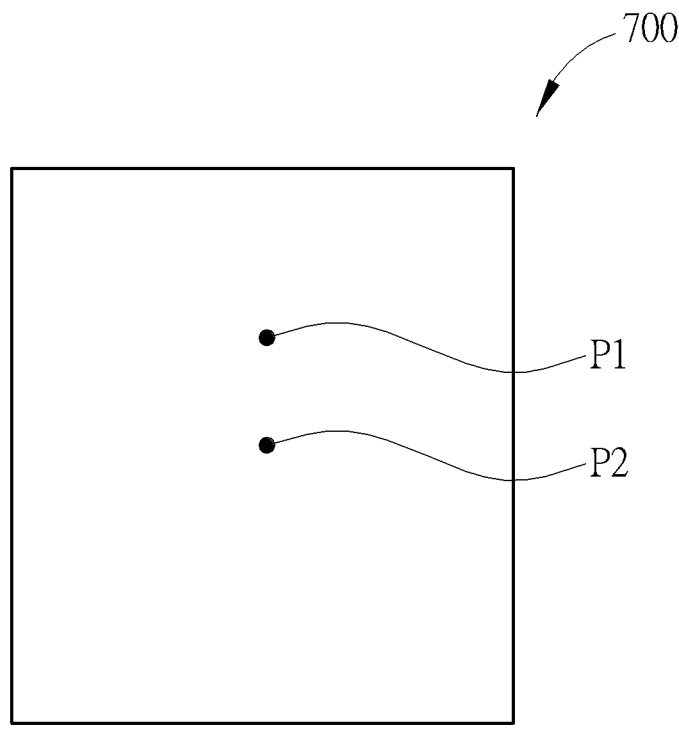
FIG. 7A and FIG. 7B are schematic diagrams illustrating examples for images captured by the image sensor in FIG. 6.
Figure 7B:
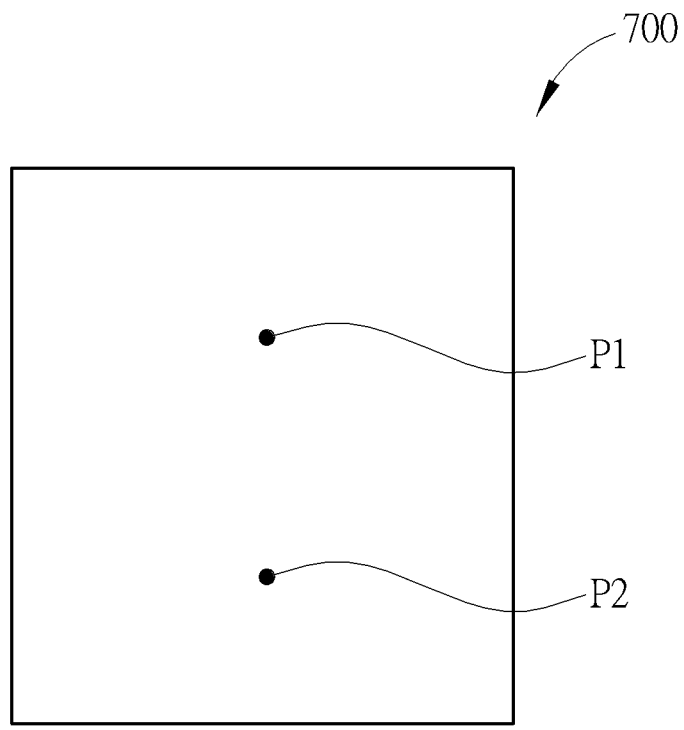

FIG. 6 is a schematic diagram illustrating an electric pot according to another embodiment of the present invention. FIG. 7A and FIG. 7B are schematic diagrams illustrating examples for images captured by the image sensor in FIG. 6. Please refer to FIG. 6, FIG. 7A and FIG. 7B to understand the embodiment in FIG. 3 for more clear. In the embodiment of FIG. 6, the light sources LS1, LS2 are provided at a first region of the electric pot 600, and the image sensor 101 is provided at a second region of the electric pot 600. In other words, the light sources LS1, LS2, and the image sensor 101 are provided at different regions of the electric pot 600, Also, the light sources LS1, LS2 are point light sources. In such case, the corresponding first light pattern has a plurality of light spots and the processor 103 determines the liquid level according to the locations or sizes of the light spots or the distance between the light spots.

FIG. 7A and FIG. 7B respectively show the first light pattern corresponding to different liquid levels viewed in the direction X of FIG. 6. In FIG. 7A, the liquid level is higher, and the distance between the light spots P1, P2 is smaller. On the opposite, in FIG. 7B, the liquid level is lower, and the distance between the light spots P1, P2 is larger. Therefore, the processor 103 can determine the liquid level of the liquid 105 according to the distance between the light spots P1, P2. Additionally, the processor 103 can determine the liquid level of the liquid 105 according to the locations of the light spots P1, P2, in view of above-mentioned descriptions.

Additionally, the processor 103 can determine the liquid level of the liquid 105 according to sizes variation of the light spots P1 and P2.

In one embodiment, the electric pot 600 comprises a storage device provided therein, which records the relations between the liquid level and the locations or sizes of the light spots. Accordingly, after the image sensor 101 captures the image of the first light pattern 700, the processor 103 can determine the locations or sizes and then determines the liquid level based on the locations or the sizes. The storage device can further record the relations between the liquid level and the distances between the light spots. Accordingly, after the image sensor 101 captures the image of the first light pattern 700, the processor 103 can determine the distances and then determines the liquid level based on the distances or the sizes.

Besides the method of determining the liquid level, the present invention further provides a method determining a solid height of the solid in the electric pot. In one embodiment, the light source in the electric pot further generates a second light pattern on a surface on at least one solid, such as rice, meat or any other food, in the liquid. The processor 103 further determines a solid height of the solid based on the second light pattern. Such embodiments are described in FIG. 8, FIG. 9A and FIG. 9B.

Figure 8:
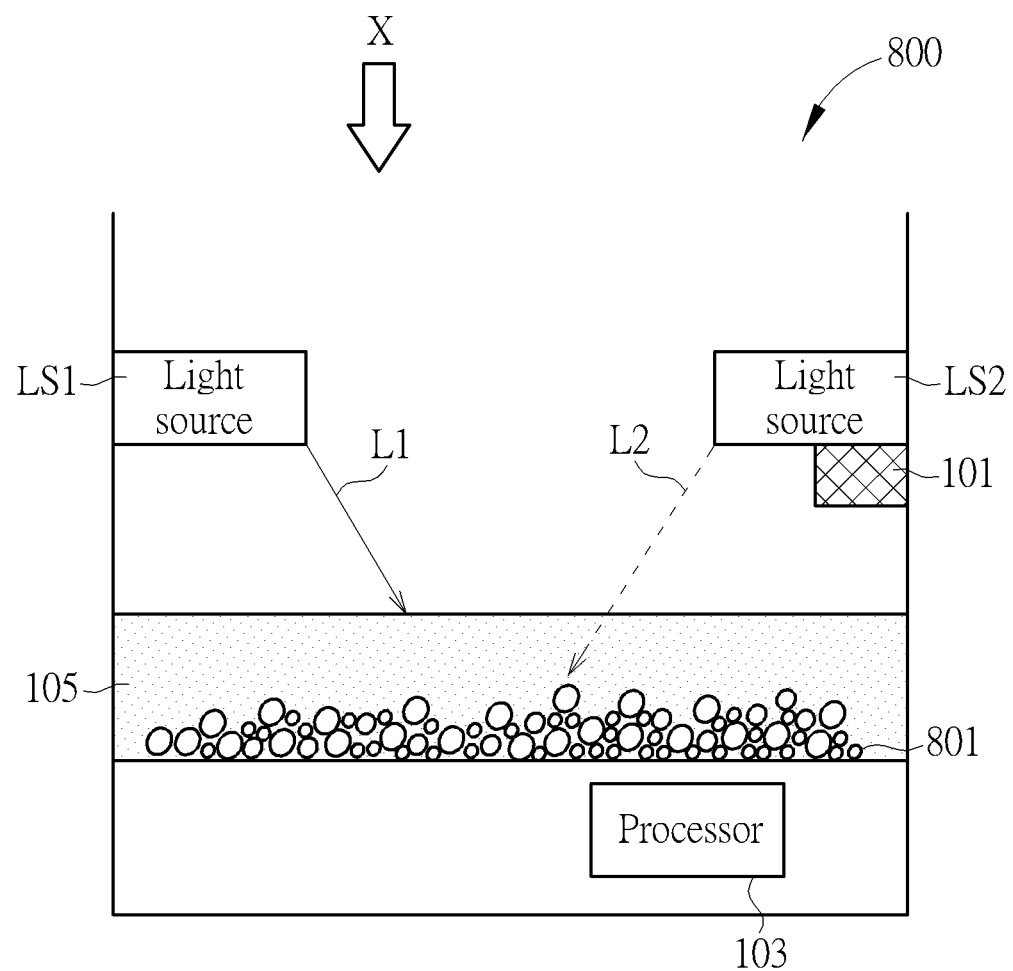
FIG. 8 is a schematic diagram illustrating an electric pot according to still another embodiment of the present invention.
Figure 9A:
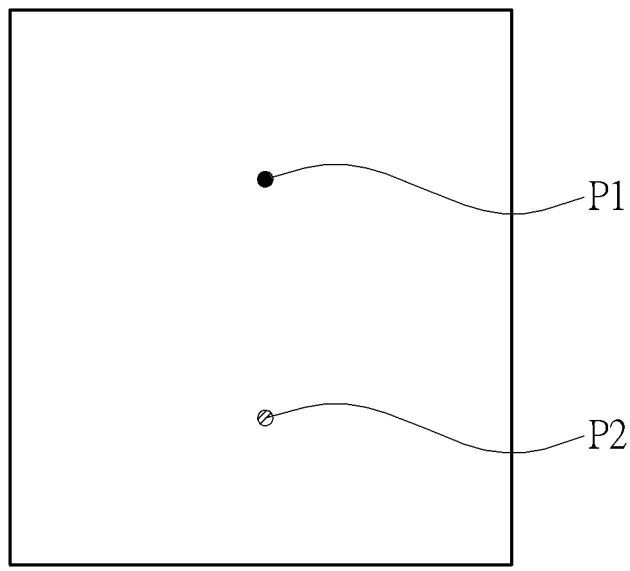
FIG. 9A and FIG. 9B are schematic diagrams illustrating examples for images captured by the image sensor in FIG. 8.
Figure 9B:
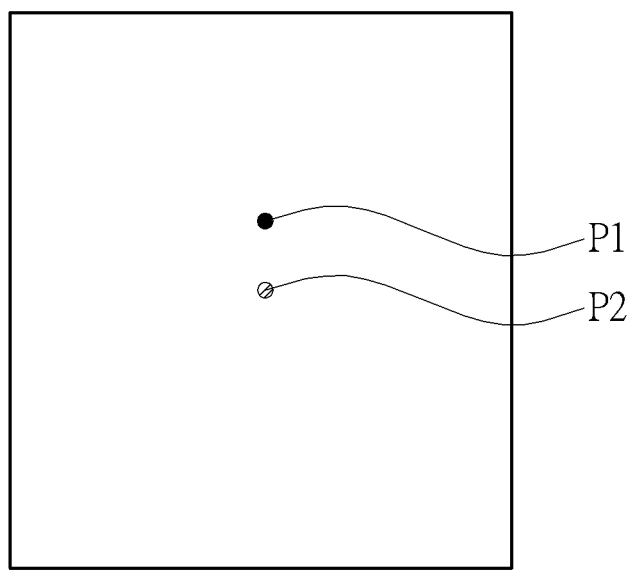

FIG. 8 is a schematic diagram illustrating an electric pot according to another embodiment of the present invention. FIG. 9A and FIG. 9B are schematic diagrams illustrating examples for images captured by the image sensor in FIG. 8. The electric pot 800 comprises a first light source LS1 and a second light source LS2. The first light source LS1 emits first light L1 having a first wavelength, and the second light source LS2 emits second light L2 having a second wavelength. The first light L1 generates the first light pattern P1 on the surface of the liquid and the second light L2 generates the second light pattern P2 on the surface of the solid 801. In the embodiment of FIG. 8, the first light source LS1 and the second light source LS2 are point light sources, thus the first light pattern P1 and the second light pattern P2 respectively in FIG. 9A and FIG. 9B are light spots. Further, in one embodiment, the first light L1 is ultraviolet light and the second light L2 is infrared light, but not limited.

In other words, the first light source LS1 and the second light source LS2 respectively generates light with different wavelengths (the first light L1 and the second light L2). In this embodiment, the first light L1 has a shorter wave length (e.g. ultraviolet light) and the second light L2 has a longer wave length (e.g. infrared light). The light with a shorter wave length may be easily reflected by the liquid 105 and the light with a longer wave length may easily pass through the liquid 105. Accordingly, the first light L1 generates the first light pattern P1 on the surface of the liquid 105 and the second light L2 generates the second light pattern P2 on the surface of the solid 801 in the embodiment of FIG. 8.

In view of above-mentioned descriptions, the locations and sizes of the light patterns P1, P2 respectively vary corresponding to different liquid levels and solid heights. Therefore, the processor 103 can determine the liquid level and the solid height according to the locations or sizes of the light patterns P1, P2. In the example of FIG. 9A and FIG. 9B, the liquid level and the solid height in FIG. 9A are higher than which in the FIG. 9B. Accordingly, the first light pattern P1 is closer to the image sensor 101 in FIG. 9B than in FIG. 9A due to the variation of the liquid level. Also, the second light pattern P2 is farer from the image sensor 101 in FIG. 9B than in FIG. 9A due to the variation of the solid height. Please note, the solid height may be different for different parts of solid in the electric pot 800. Therefore, in one embodiment, several solid heights can be calculated and then an average value thereof is calculated as the final solid height.

In one embodiment, the electric pot 800 comprises a storage device provided therein, which records the relations between the liquid level and the locations or sizes of the first light pattern P1 and records the relations between the liquid level and the locations of the second light pattern P2. Accordingly, after the image sensor 101 captures the image of the first light pattern P1 and the second light pattern P2, the processor 103 can determine the locations thereof and then determines the liquid level and the solid height based on the locations.

After acquiring the liquid level and/or the solid height, the electric pot can show the liquid level and/or the solid height to the user, such that the user can check whether the amounts of the liquid (e.g. water or soup) or amounts of the solid are proper or not. Also, the electric pot can determine the power should be used based on the liquid level and/or the solid height.

In one embodiment, the electric pot can receive or record a plurality of recipes. Each of the recipes may correspond to a recommended liquid level and/or a recommended solid height. Accordingly, the electric pot may provide a liquid level adjusting suggestion after comparing the actual liquid level acquired by above-mentioned methods with the recommended liquid level. Also, the electric pot may provide a solid height adjusting suggestion after comparing the actual solid height acquired by above-mentioned methods with the recommended solid height.

Please note the above-mentioned embodiments are only for examples and do not mean to limit the scope of the present invention. The relations between the light patterns and the liquid level, or the relations between the light patterns and the solid height may change corresponding to different locations of the image sensor or the light source, or the shape of the electric pot, or the size of the electric pot. Besides, the persons skilled in the art change the light source and determine the liquid level and/or the solid level according to a different light pattern in view of above-mentioned disclosure, to reach the same function. Such variations should also fall in the scope of the present invention.

Further, in one embodiment, the image sensor 101 or the light source LS can have some mechanisms in order to work smoothly in the electric pot 100. For example, some materials can protect the image sensor 101 or the light source LS from moisture, such as hydrophobic material, can be provided on the image sensor 101 or the light source LS. Additionally, some materials can protect the image sensor 101 or the light source LS from heat can be provided on the image sensor 101 or the light source LS.

Additionally, the above-mentioned disclosure can be applied to other devices that need to determine the liquid level or solid level rather than limited to the electric pot.

In view of above-mentioned embodiments, the liquid level or the solid height can be calculated in an optical manner, thus the user may feel more convenience while using the electric pot.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric pot, comprising:
   at least one light source, configured to emit light to liquid in the electric pot, wherein the light forms a first light pattern on a surface of the liquid;
   an image sensor, configured to detect the first light pattern; and
   a processor, configured to determine a liquid level of the liquid based on the first light pattern;
   wherein the light source further generates a second light pattern on a surface on at least one solid in the liquid;
   wherein the processor further determines a solid height of the solid based on the second light pattern;
   wherein the light sources comprise a first light source generating first light having a first wavelength, and comprises a second light source generating second light having a second wavelength larger than the first wavelength;
   wherein the first light generates the first light pattern on the surface of the liquid, and the second light generates the second light pattern on the surface of the solid.

2. The electric pot of claim 1,
   wherein the first light source is a line light source;
   wherein the first light pattern has a first region and a second region, and a variation rate of the first region is larger than a variation rate of the second region;
   wherein the processor determines the liquid level according to a junction of the first region and the second region or according to a shape of the first region, or according to a shape of the second region.

3. The electric pot of claim 2, wherein the first region has a gradually decreasing width and the second region has a constant width.

4. The electric pot of claim 2, wherein the first light source and the image sensor are provided at an identical region of the electric pot.

5. The electric pot of claim 1,
   wherein the first light source is a structured light source and the first light pattern has a plurality of bright regions and dark regions;
   wherein the processor determines the liquid level according to a density of the bright regions.

6. The electric pot of claim 5, wherein the first light source is provided at a first region of the electric pot, and the image sensor is provided a second region opposite to the first region.

7. The electric pot of claim 1,
   wherein the first light pattern comprises at least one light spot;
   wherein the processor determines the liquid level according to at least one location of the light spot or a distance between the light spots.

8. The electric pot of claim 7, wherein the first light source is provided at a first region of the electric pot, and the image sensor is provided a second region opposite to the first region.

9. The electric pot of claim 1, wherein the first light is ultraviolet light and the second light is infrared light.

10. A liquid level determining method, applied to an electric pot, comprising:
    (a) applying at least one light source to emit light to liquid in the electric pot to generate a first light pattern on a surface of the liquid; and
    (b) determining a liquid level of the liquid based on the first light pattern;
    wherein the light source further generates a second light pattern on a surface on a solid in the liquid;
    wherein the step (b) further determines a solid height of the solid based on the second light pattern;
    wherein the light source comprises a first light source generating first light having a first wavelength, and comprises a second light source generating second light having a second wavelength larger than the first wavelength;
    wherein the first light generates the first light pattern on the surface of the liquid, and the second light generates the second light pattern on the surface of the solid.

11. The liquid level determining method of claim 10,
    wherein the first light source is a line light source;
    wherein the first light pattern has a first region and a second region, and a variation rate of the first region is larger than a variation rate of the second region;
    wherein the step (b) determines the liquid level according to a junction of the first region and the second region.

12. The liquid level determining method of claim 11, wherein the first region has a gradually increasing width and the second region has a constant width.

13. The liquid level determining method of claim 10,
    wherein the first light source is a structured light source and the first light pattern has a plurality of bright regions and dark regions;
    wherein the step (b) determines the liquid level according to a density of the bright regions.

14. The liquid level determining method of claim 10,
    wherein the first light pattern has at least one light spot;
    wherein the step (b) determines the liquid level according to at least one location of the light spot.

15. The liquid level determining method of claim 10, wherein the first light is ultraviolet light and the second light is infrared light.

* * * * *